Aug. 12, 1958 B. R. BAGLEY 2,846,893
FABRICATED GROOVED PULLEY
Filed Feb. 25, 1953
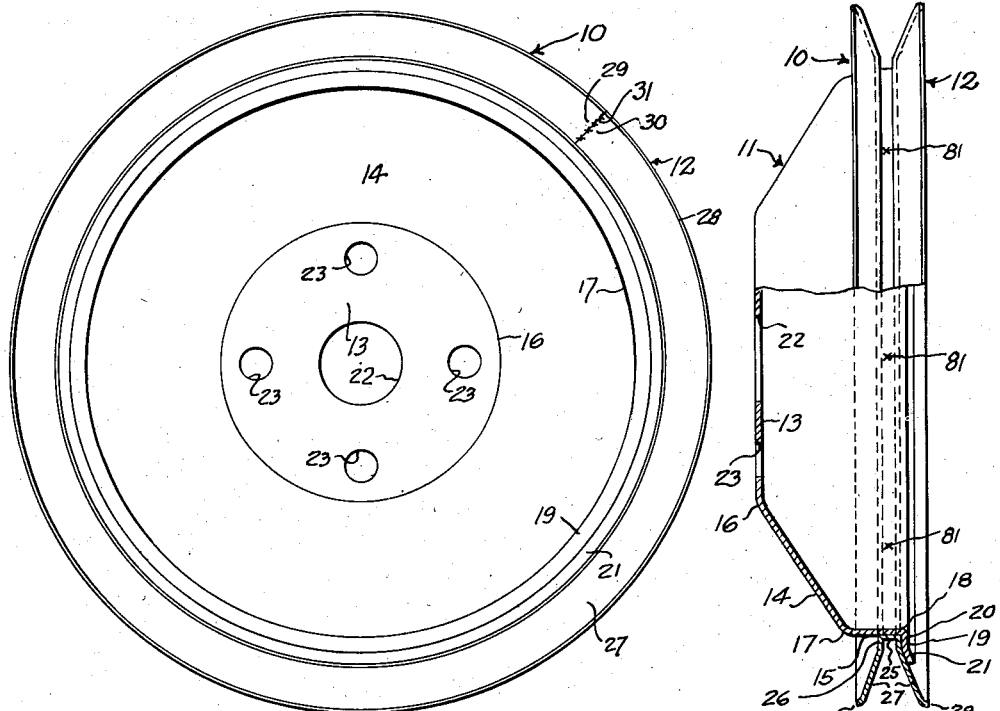
Fig. 1.   Fig. 2.
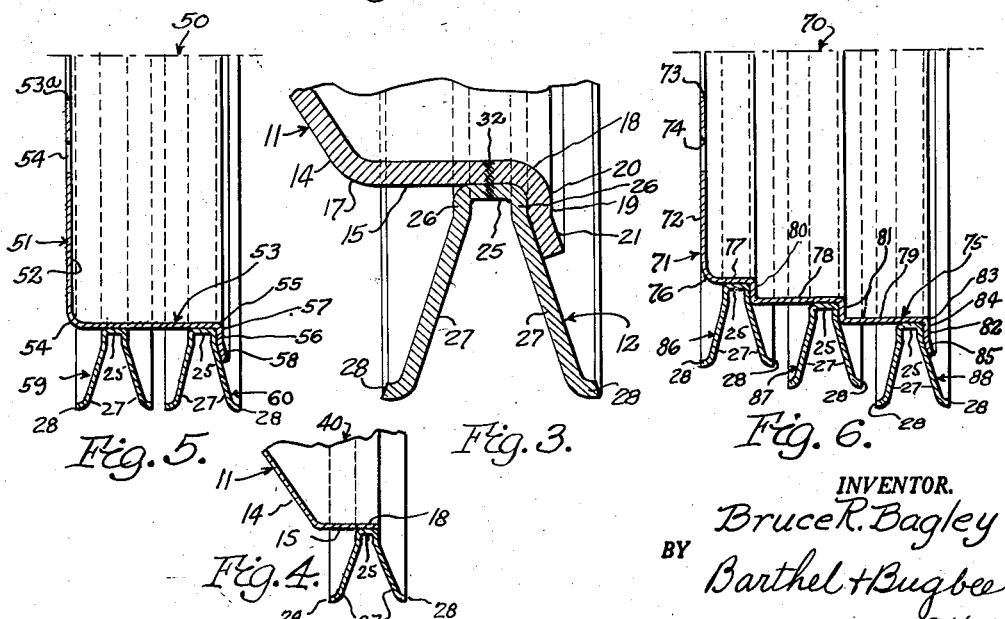
Fig. 5.   Fig. 3.   Fig. 6.
Fig. 4.
INVENTOR.
Bruce R. Bagley
BY Barthel + Bugbee
Attys "# United States Patent Office 2,846,893
Patented Aug. 12, 1958

2,846,893

FABRICATED GROOVED PULLEY

Bruce R. Bagley, Detroit, Mich.

Application February 25, 1953, Serial No. 338,733

4 Claims. (Cl. 74—230.8)

This invention relates to pulleys and, in particular, to fabricated or built-up pulleys.

One object of this invention is to provide a fabricated grooved pulley, wherein the hub portion, which is required to sustain the heavier part of the load, is stamped in a separate piece from the sheave of channeled peripheral portion which forms the belt groove, thereby enabling the sheave to be made from thinner material, accordingly economizing on the use of such material and consequently reducing the cost of manufacture.

Another object is to provided a fabricated grooved pulley, as set forth in the foregoing objects, wherein the sheave portion may be secured to the hub portion by welding, interengaging dimpling or by a stretch fit, with the result that the two portions in effect become integrally united, thereby giving the advantages of an integral or one-piece pulley with the ease and strength of construction afforded by the invention.

Another object is to provide a fabricated grooved pulley, as set forth in the preceding objects, which is especially well adapted for use where a pulley with a large overhang is required or is advantageous.

Another object is to provide a fabricated grooved pulley which can be constructed in modified form with multiple sheaves either of the same or of different diameters.

Other objects and advantages of the invention will become apparent during the course of the following description of the accompanying drawings, wherein:

Figure 1 is a front elevation of a fabricated grooved pulley according to one form of the invention;

Figure 2 is a side elevation, partly in central vertical section, of the fabricated grooved pulley shown in Figure 1;

Figure 3 is an enlarged fragmentary view of the lower portion of Figure 2, showing the sheave spot-welded to the hub;

Figure 4 is a fragmentary central vertical section through the peripheral portion of a modification of the pulley shown in Figures 1 to 3 inclusive, wherein the hub flange is omitted;

Figure 5 is a central vertical section through the lower half of a further modification of the invention which provides a multiple sheave pulley with sheaves of the same diameter; and Figure 6 is a central vertical section through the lower half of a still further modification of the invention which provides a stepped multiple sheave pulley.

In many pulley installations, particularly with pulleys having a large overhang or other reasons requiring a hub of increased strength, it has hitherto been necessary to make the entire pulley out of heavy metal where it was desired to take advantage of stamping processes for forming the pulley from sheet metal. Where grooved pulleys were required, prior methods of manufacture and designs of such pulleys resulted in a pulley of rather high cost of manufacture in order to gain the requisite strength for the pulley. Such pulleys, as are presently made, for example, for driving automobile engine cooling fans, generators, air conditioning apparatus or the like, have been fragile and of inadequate working life where insufficiently thick metal was provided in the hub. Moreover, prior pulleys of the multiple sheave type, either of the same or stepped diameters, have been expensive to manufacture, and if made of insufficiently thick metal have been still more fragile than single sheave pulleys because of the great overhang required for the multiple sheave. Multiple sheave pulleys, however, are becoming of increasingly greater importance because of the additional mechanical or electrical units being driven from the engine shaft such as, for example, air conditioning apparatus now coming into increased use.

The present invention provides an improved fabricated pulley and method of making the same, wherein the hub of the pulley is in the form of a cup-shaped sheet metal shell or stamping and the sheave secured to the hub in any suitable way, such as by welding, dimpling or by a stretch fit. In this manner, the hub may be made of thicker or stronger metal than the sheave in order to sustain the greater stresses resulting from the increased load to which the hub is subjected. The invention enables a narrow strengthening and locating flange or abutment to be formed at the edge of the hub, so that the sheave comes to rest against this edge flange in a precisely predetermined location. By a modification of the invention (Figure 4) this locating or strengthening flange may be omitted, if desired, where the conditions of use permit it. By a further modification of the invention (Figures 5 and 6), the hub may be made of greater depth with a side wall which is either of uniform or stepped diameters to accommodate multiple sheaves of the same or different diameters.

Referring to the drawings in detail, Figure 1 shows a fabricated pulley, generally designated 10, according to one form of the invention as consisting generally of a central hub 11 upon which a peripheral sheave 12 is mounted and to which it is secured. The hub 11 is in the form of a cupped or shell stamping having a disc-shaped end wall 13 disposed substantially perpendicular to the axis, a cylindrical side wall 15, and a flared intermediate wall 14 diverging outwardly from the edge 16 of the end wall 13 to the forward edge 17 of the side wall 15. The opposite or rearward edge 18 of the side wall 15 is provided with a narrow locating flange or abutment 19, the inner portion 20 of which is substantially perpendicular to the axis (Figure 3) and the outer portion 21 is flared outwardly from the inner portion 20. The end wall 13 is provided with a central aperture 22 for the reception of a shaft (not shown) and is also provided with circumferentially-spaced outer holes 23 for the reception of bolts, screws or other fasteners by which the hub 11 is attached to a driving flange or hub (not shown).

The sheave 12 is most easily formed from an elongated strip of metal of sufficient length to extend around the side wall 15 of the hub 11, and rolled or otherwise suitably formed into a channel member with a bottom wall 25, perpendicular lateral wall portions 26 and outwardly and oppositely-flared lateral wall portions 27 (Figure 3), terminating in a bead or edge flange 28. The channel member thus made is of truncated approximately V-shaped cross-section and is formed into an annular shape and its opposite ends 29 and 30 welded together as at 31. The sheave 12 may be secured to the hub 11 by any suitable means, such as by spot-welding as at 32 (Figure 3), the bottom portion 25 of the sheave 12 to the side wall 15 of the hub 11. The edge flange 19 of the hub 11 in this case serves not only to strengthen the edge of the hub 11 but also as a locating flange, abutment or annular stop for accurately positioning the sheave 12. In place of the spot-welding 32, the sheave 12 may be secured to the hub 11 by means of a stretch fit in which, as the name signifies, the sheave 12 of slightly smaller internal diameter than the external diameter of the hub 11 is stretched upon the hub 11 so as to place the sheave 12 in a state of tension and the hub 11 in a state of compression.

The modified fabricated pulley, generally designated 40, shown in Figure 4 is similar to the fabricated pulley 10 of Figures 1, 2 and 3, with the exception of the fact that the edge flange 19 of the hub 11 has been omitted. The remaining features of the pulley 40 and its manner of manufacture are substantially the same as the fabricated pulley 10 of Figures 1, 2 and 3. In the fabricated pulley 40, however, the edge 18 of the hub side wall 15 may serve as a stop for a fixture against which the sheave 14 rests during the welding or other securing operation.

The modified fabricated pulley, generally designated 50, of Figure 5 is a multiple sheave uniform diameter pulley wherein the hub 51 has a disc-shaped end wall 52 with a central shaft hole 53a and outlying fastener holes 54, but lacks the inclined portion 14 of the hub 11 of the fabricated pulley 10. In its place, the central portion 52 of the hub 51 is joined directly to the cylindrical side wall 53 at a rounded junction 54. The rearward edge 55 of the side wall 53 terminates in an edge flange or abutment 56, the inner portion 57 of which is substantially perpendicular to the axis of rotation and the outer portion 58 flared relatively thereto in a manner similar to the corresponding portions 20 and 21 (Figure 3) of the side wall flange 19 of the hub 11 and for the same purposes. The modified pulley 50, however, is provided with multiple sheaves 59 and 60 which are of the same construction as the sheaves 12 and similarly secured to the side wall 53 in the manner already described in connection with Figure 3. The multiple sheaves 59 and 60, however, are mounted side by side in the side wall 53, preferably in slightly spaced relationship to avoid interference between the belts mounted in the different sheaves. It is obvious that the edge flange 56 may be omitted from the side wall 53 of the hub 51, the same as in Figure 4.

The modified stepped multiple sheave fabricated pulley, generally designated 70, (Figure 6), has a hub 71 with a disc-shaped end wall 72 having the central shaft hole 73 and marginal fastener holes 74 as before, and, as in the Figure 5 modification, the side wall, generally designated 75, is joined directly to the end wall 72 at a rounded annular junction 76. Where the side wall 53 of the hub 51 of Figure 5 was of uniform diameter, however, the side wall 75 has multiple stepped cylindrical portions 77, 78 and 79 respectively, separated from one another by radial annular walls 80 and 81. An edge flange or abutment 82 formed on the rearward edge 83 of the side wall 75 has radial and flared portions 84 and 85 respectively as in the case of the edge flanges 19 of Figure 3 and 56 of Figure 5 described above.

Mounted on the stepped cylindrical portions 77, 78 and 79 of different diameters on the hub 71 are multiple sheaves 86, 87 and 88 respectively. The sheaves 86, 87 and 88 are of substantially the same construction as the sheaves 12 of Figure 3 or the sheaves 60 of Figure 5, but are of different diameters corresponding to the different diameters of the marginal portions 77, 78 and 79 to which they are secured in the same manner as described above in connection with Figure 3. In the Figure 6 modification, however, the rearward edge flange 82 serves as a locating stop for the largest diameter sheave 88, whereas the annular walls 81 and 80 serve as locating stops for the middle and small diameter sheaves 87 and 86 respectively. It is, of course, obvious that the rearward edge flange 82 may be omitted in Figure 6 the same as in Figure 4.

In operation, the pulley in any of its forms 10, 40, 50 or 70 is used in the same manner as a conventional pulley and replaces the latter. The pulley, whatever its form, is mounted on a pulley shaft extending through the hole 22, 53 or 73, and drivingly secured thereto by bolts, screws or other fasteners extending through the holes 23, 54 or 74 into a suitable annular flange on the shaft or in an auxiliary collar or hub mounted thereon. The pulley 10 or 40 is driven by any suitable belt, such as a conventional V-belt (not shown) or, in the case of the multiple sheave pulleys 50 and 70, by several such belts. Each belt in turn engages and is driven by a pulley from a drive shaft, such as an engine crankshaft, where the pulley is employed to drive a cooling fan and water pump. The load imposed upon the hub of the pulley is sustained by the heavier metal of which the hub is optionally made, the sheaves being optionally of lighter gauge metal since they are subject to less stress than the hub to which they are secured. The edge flanges 19, 56 or 82 (Figures 2, 5 and 6) as well as the intermediate annular walls 80 and 81 (Figure 6) serve to strengthen and reinforce the hub 11, 51 or 71 on which they are formed, thus increasing the working life of the pulley and enhancing its dependability.

The words "fit" and "interference fit" are used below in the same sense as they are defined in Webster's New International Dictionary, Second Edition, 1944, G. & C. Merriam Co., Springfield, Mass, page 957, as follows: "fit . . . 4. Mach. Coincidence of parts in contact; tightness of adjustment of adjacent parts . . . An 'interference fit' is one in which there is an interference of metal between the shaft and hole, even when the hole is the largest and the shaft the smallest that the specified tolerances permit."

By "stretch fit" in the claim 3 I mean an interference fit between the exterior of an inner sheet metal part (herein the hub) and the interior of a hollow outer sheet metal part (herein the sheave) forced together unheated into such tight interfitting engagement with one another as to place the inner part in compression and the outer part in tension in a stretched condition upon the inner part.

What I claim is:

1. A fabricated grooved sheet metal pulley comprising a cup-shaped one-piece sheet metal hub having an approximately cylindrical side wall and a disc-shaped end wall integral with said side wall disposed perpendicular to said side wall adjacent one end thereof, said end wall having means thereon for attaching said hub to a rotary support; and a grooved annular one-piece sheet metal sheave of truncated approximately V-shaped cross-section mounted on said side wall in offset relationship to said end wall and providing an overhang for said sheave relatively to said end wall, said sheave having an annular bottom wall tightly secured with a stretch fit to the exterior of said cylindrical side wall of said hub with said sheave in a state of tension and said hub in a state of compression, said sheave having annular opposite lateral walls integral with said bottom wall and flared away from the opposite edges of said bottom wall, said hub at the edge of said side wall remote from said end wall having an abutment integral therewith and projecting outward therefrom approximately perpendicular thereto, one of said lateral walls of said sheave abuttingly engaging said abutment.

2. A fabricated grooved sheet metal pulley, according to claim 1, wherein said side wall has a width sufficient to accommodate a plurality of sheaves, and wherein a plurality of annular one-piece sheet metal sheaves of truncated approximately V-shaped cross-section are tightly mounted with a stretch fit side by side on said side wall with one of said sheaves abuttingly engaging the abutment on said hub.

3. A fabricated grooved sheet metal pulley, according to claim 2, wherein the portion of said side wall upon which the sheaves are mounted is of substantially uniform diameter and wherein the sheaves are also of substantially the same diameters.

4. A fabricated grooved sheet metal pulley, according to claim 2, wherein the portion of the side wall upon which the sheaves are mounted includes a plurality of stepped substantially cylindrical portions of different diameters, and wherein the sheaves are of different diameters corresponding respectively to the different diameters of said stepped cylindrical portions.

References Cited in the file of this patent

UNITED STATES PATENTS

| | | | |
|---|---|---|---|
| 665,949 | Albert | Jan. 15, | 1901 |
| 1,090,505 | Sparks | Mar. 17, | 1914 |
| 1,266,579 | Garcelon | May 21, | 1918 |
| 1,403,608 | Leisse | Jan. 17, | 1922 |
| 1,416,063 | Reddig | May 16, | 1922 |
| 1,623,883 | Michelin | Apr. 5, | 1927 |
| 1,634,438 | Spreen | July 5, | 1927 |
| 1,635,895 | Michelin | July 12, | 1927 |
| 1,700,416 | Nelson | Jan. 29, | 1929 |
| 1,745,153 | Dalton | Jan. 28, | 1930 |
| 1,756,592 | Harrison | Apr. 29, | 1930 |
| 2,092,571 | Cole | Sept. 7, | 1937 |
| 2,353,466 | Heintz et al. | July 11, | 1944 |
| 2,493,053 | Zatyko | Jan. 3, | 1950 |
| 2,680,380 | Bagley | June 8, | 1954 |

FOREIGN PATENTS

| | | | |
|---|---|---|---|
| 453,111 | Great Britain | Sept. 4, | 1936 |